Jan. 13, 1931.   H. B. HULL   1,788,393
REFRIGERATING APPARATUS
Original Filed Jan. 21, 1925   11 Sheets-Sheet 1

Inventor
Harry B. Hull
By Spencer, Sewall, and Hardman
Attorneys

Jan. 13, 1931.  H. B. HULL  1,788,393
REFRIGERATING APPARATUS
Original Filed Jan. 21, 1925   11 Sheets-Sheet 3

Inventor
Harry B. Hull
By Spencer, Sewall, and Hardman
Attorneys

Jan. 13, 1931.  H. B. HULL  1,788,393
REFRIGERATING APPARATUS
Original Filed Jan. 21, 1925   11 Sheets-Sheet 4
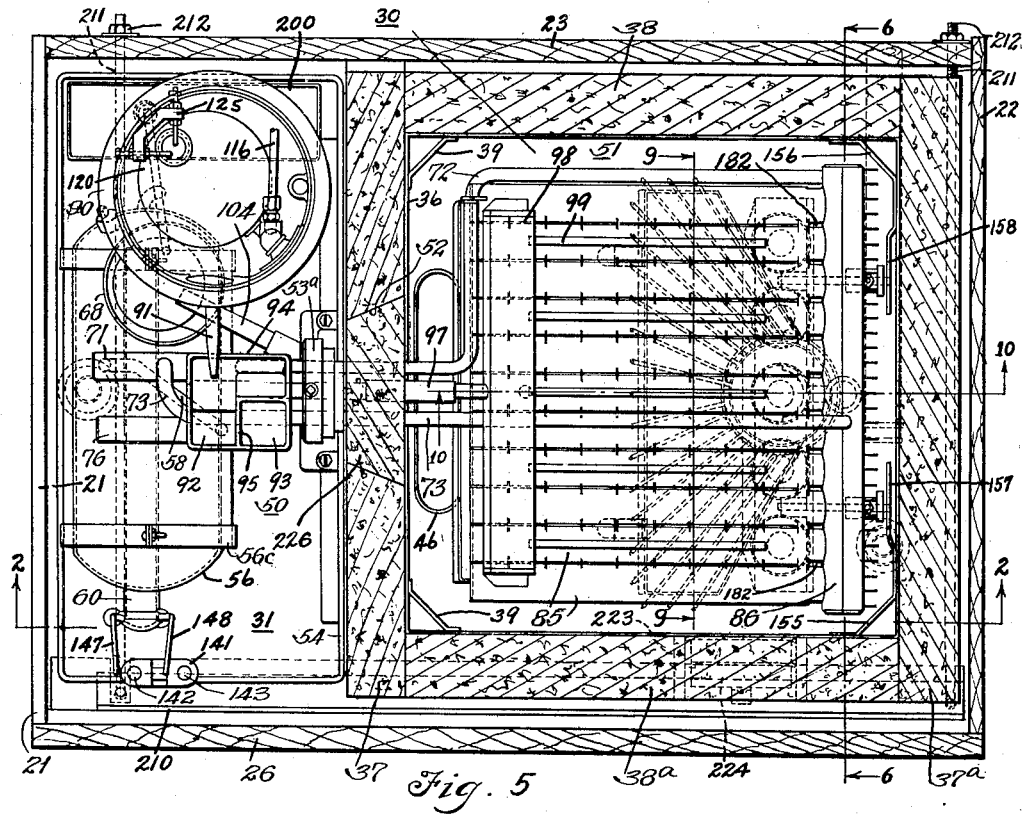
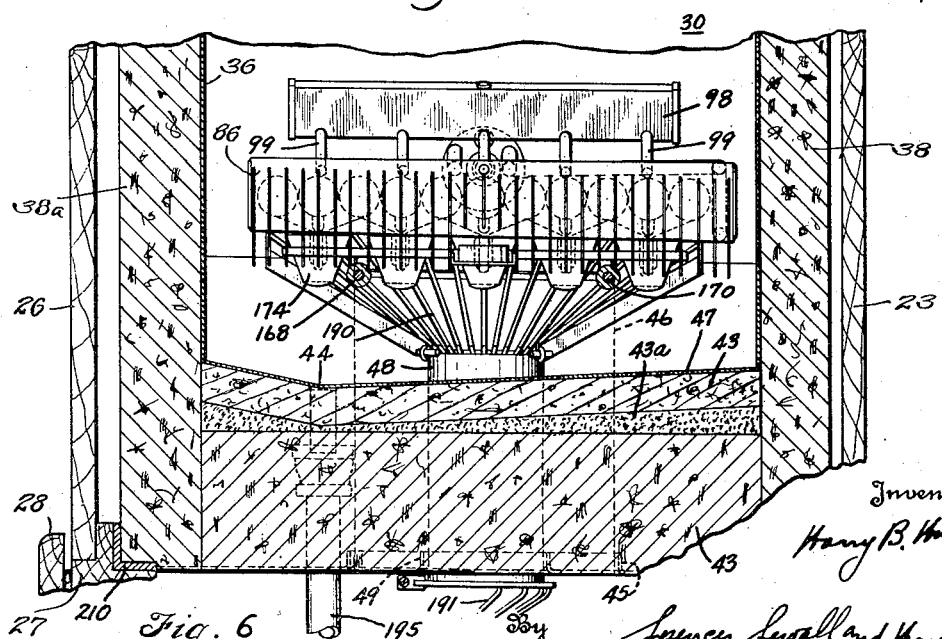

Jan. 13, 1931.  H. B. HULL  1,788,393
REFRIGERATING APPARATUS
Original Filed Jan. 21, 1925  11 Sheets-Sheet 5

Inventor
Harry B. Hull

By Spencer, Sewall and Hardman
Attorneys

Jan. 13, 1931. H. B. HULL 1,788,393
REFRIGERATING APPARATUS
Original Filed Jan. 21, 1925 11 Sheets-Sheet 6
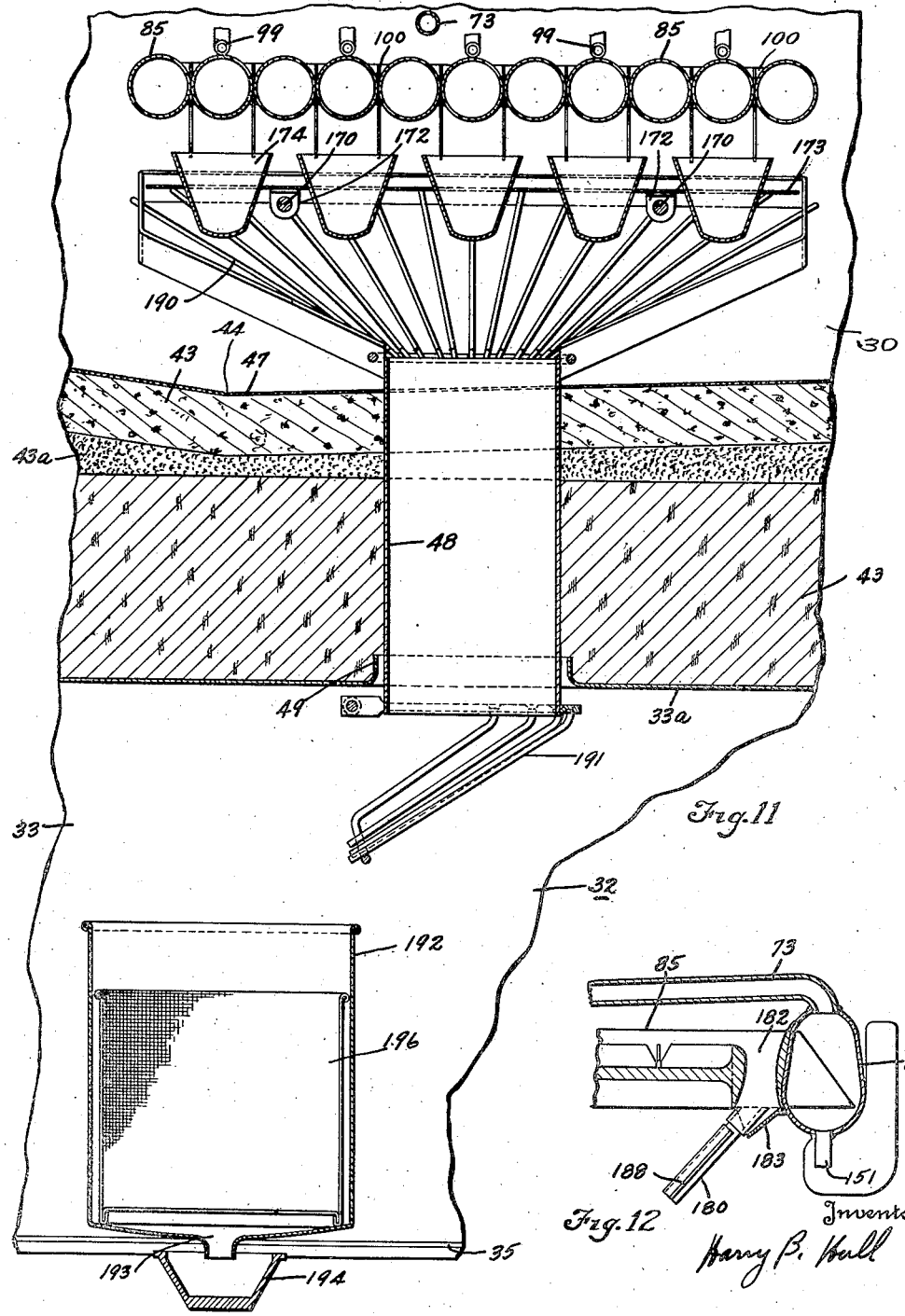

Jan. 13, 1931.  H. B. HULL  1,788,393
REFRIGERATING APPARATUS
Original Filed Jan. 21, 1925   11 Sheets-Sheet 7

Inventor
Harry B. Hull
By Spencer, Small, and Hardman
Attorneys

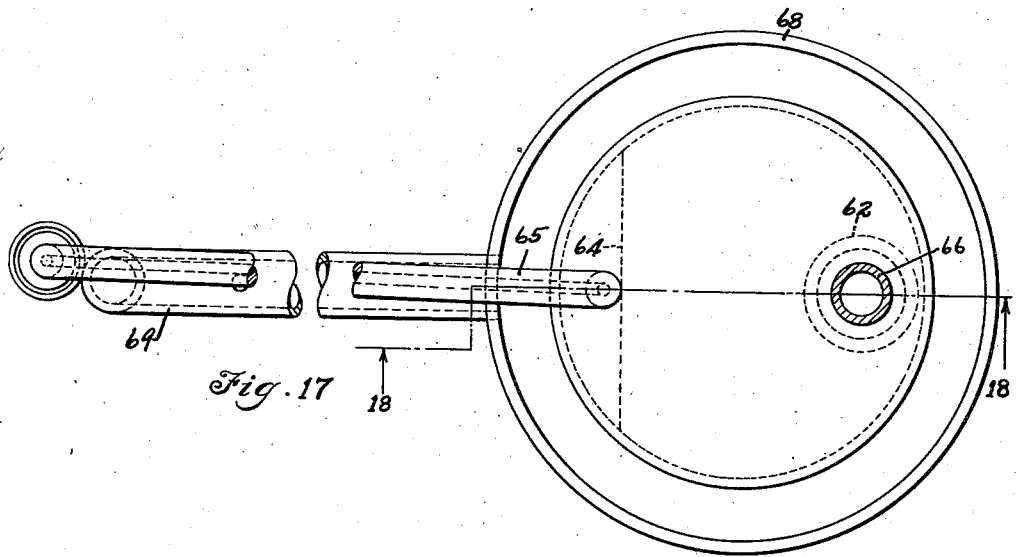
Fig. 17
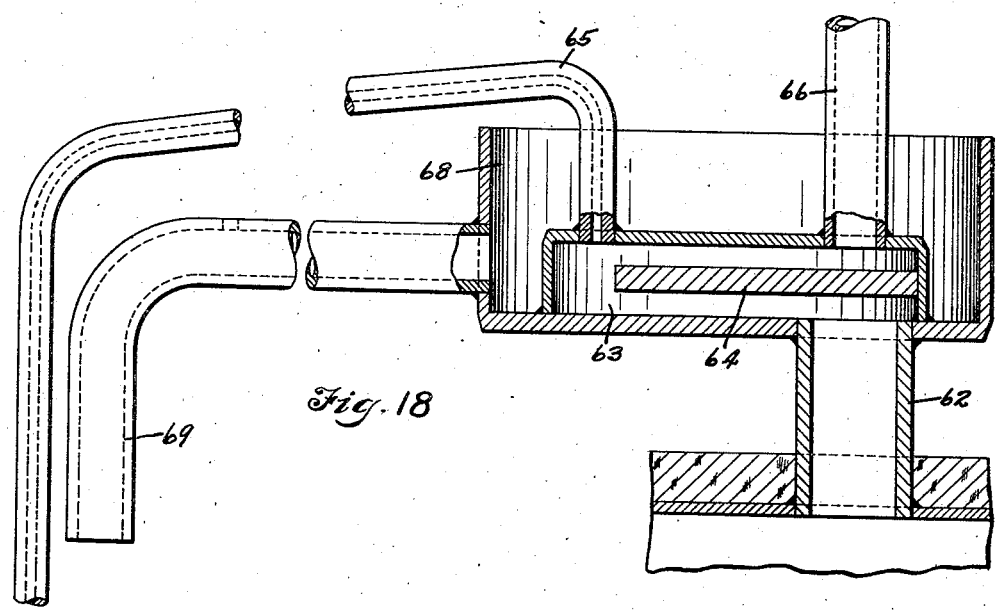
Fig. 18
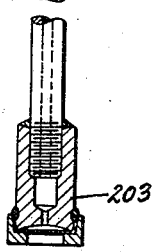

Jan. 13, 1931.   H. B. HULL   1,788,393
REFRIGERATING APPARATUS
Original Filed Jan. 21, 1925   11 Sheets-Sheet 10

Inventor
Harry B. Hull
By Spencer, Sewall, and Hardman
Attorneys

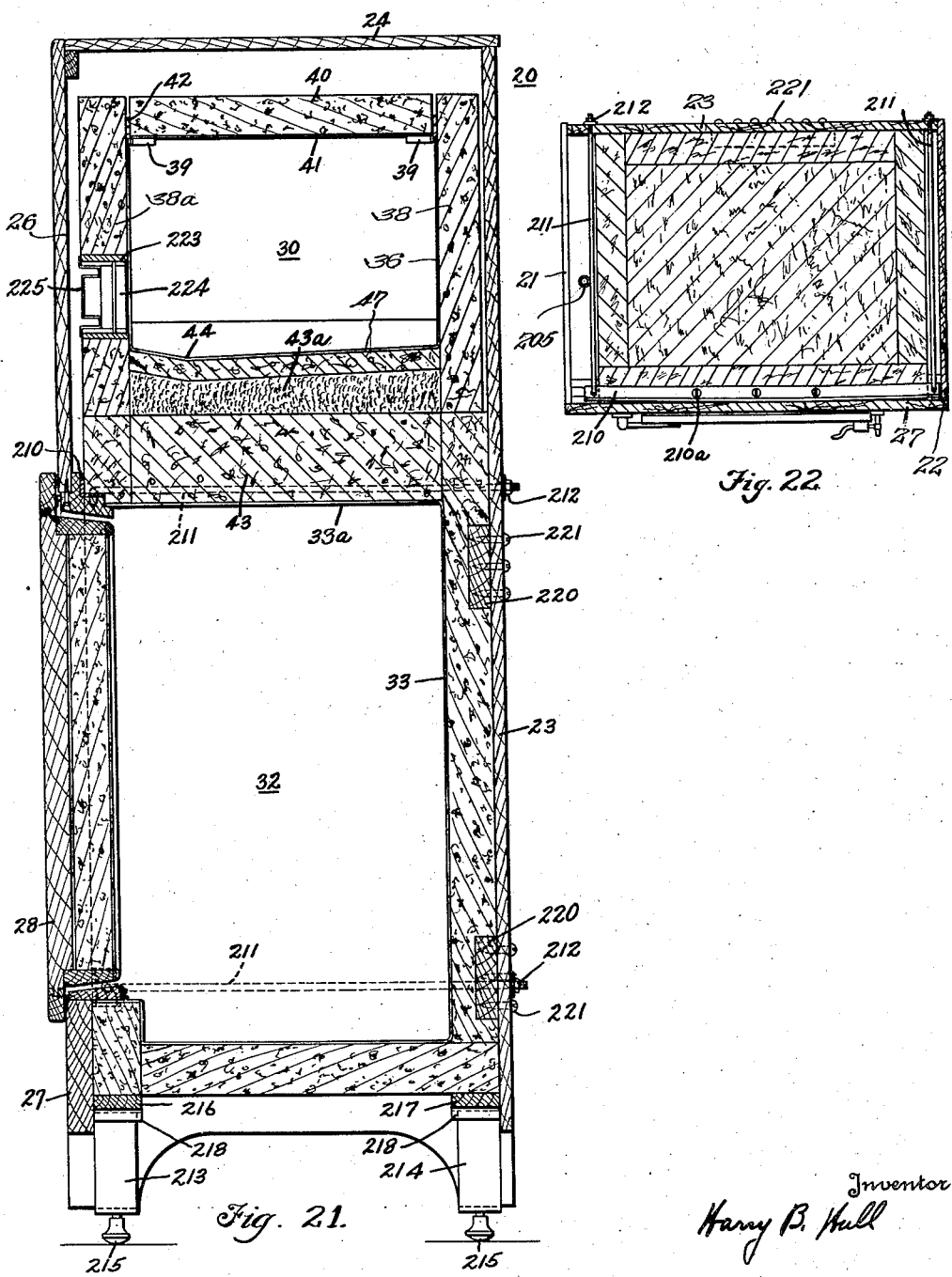

Patented Jan. 13, 1931

1,788,393

UNITED STATES PATENT OFFICE

HARRY B. HULL, OF DAYTON, OHIO, ASSIGNOR, BY MESNE ASSIGNMENTS, TO FRIGIDAIRE CORPORATION, A CORPORATION OF DELAWARE

REFRIGERATING APPARATUS

Application filed January 21, 1925, Serial No. 3,789. Renewed December 5, 1929.

The present invention relates to refrigerating machines and particularly to the household type of refrigerating machine.

One of the objects of the present invention is to improve the general construction of refrigerating systems whereby to reduce the cost, facilitate the manufacture of the machine and increase the efficiency of the machine. In carrying out the above object, the air circulating system of a refrigerator cabinet includes means for causing the air, passing through the cooling compartment containing the cooling unit, to be circulated only through the coldest part of the cooling compartment. Further, the passage for cool air from the cooling compartment to the food compartment is also utilized for conducting ice, which is made in the cooling compartment, to a receptacle within the food compartment, and the construction and arrangement of the passage with respect to the receptacle is such that the passage of air from the cooling compartment to the food compartment is not impeded by the receptacle.

Another object of the invention is to provide a simplified drain for conducting liquid, which tends to collect within the cooling compartment, from the cooling compartment, said drain being adapted to drain the ice receptacle.

The present invention includes an absorption refrigerator of the type which rocks about a pivot and which, when in one position, causes a cooling within the cooling compartment and during this cooling cycle, water is frozen into ice blocks, and, when the mechanism is moved to another position, the ice blocks are lifted from the receptacles in which they were frozen. These receptacles are carried by a wall of the cooling compartment and it is an object of this invention to provide a simple device whereby the receptacles can be accurately aligned with respect to the machine and to so construct and arrange the supporting means for the receptacles, that buckling or bending of the cooling compartment wall will not materially effect the adjustment of the receptacles with respect to the machine.

Another object of the invention is to provide a mercury operated control valve in which only a relatively small amount of mercury is necessary for the proper functioning of same.

Another object of the invention is to improve the construction of the refrigerator cabinet, the construction and manner of assembling the same, so that variations in the parts enclosed by the cabinet walls will not effect the assembling of the cabinet.

Further objects and advantages of the present invention will be apparent from the following description, reference being had to the accompanying drawings, wherein a preferred form of embodiment of the present invention is clearly shown.

In the drawings:

Fig. 5 is a sectional view of the cabinet showing the top of the refrigerating mechanism in plan, the generator housing cover being omitted.

Fig. 6 is a sectional view taken on line 6—6 of Fig. 5.

Fig. 7 is a fragmentary sectional view taken on line 7—7 of Fig. 2 the refrigerating mechanism being omitted for the sake of clearness.

Fig. 8 is a sectional view taken on line 8—8 of Fig. 7.

Fig. 11 is a sectional view taken on line 11—11 of Fig. 2.

Fig. 12 is a fragmentary sectional view taken on line 12—12 of Fig. 9.

Fig. 17 is a plan view of a dehydrator used in the refrigerating system.

Fig. 18 is a sectional view taken on line 18—18 of Fig. 17.

Fig. 21 is a sectional view taken on line 21—21 of Fig. 1, and

Fig. 22 is a sectional view taken on line 22—22 of Fig. 1.

Figure 1:
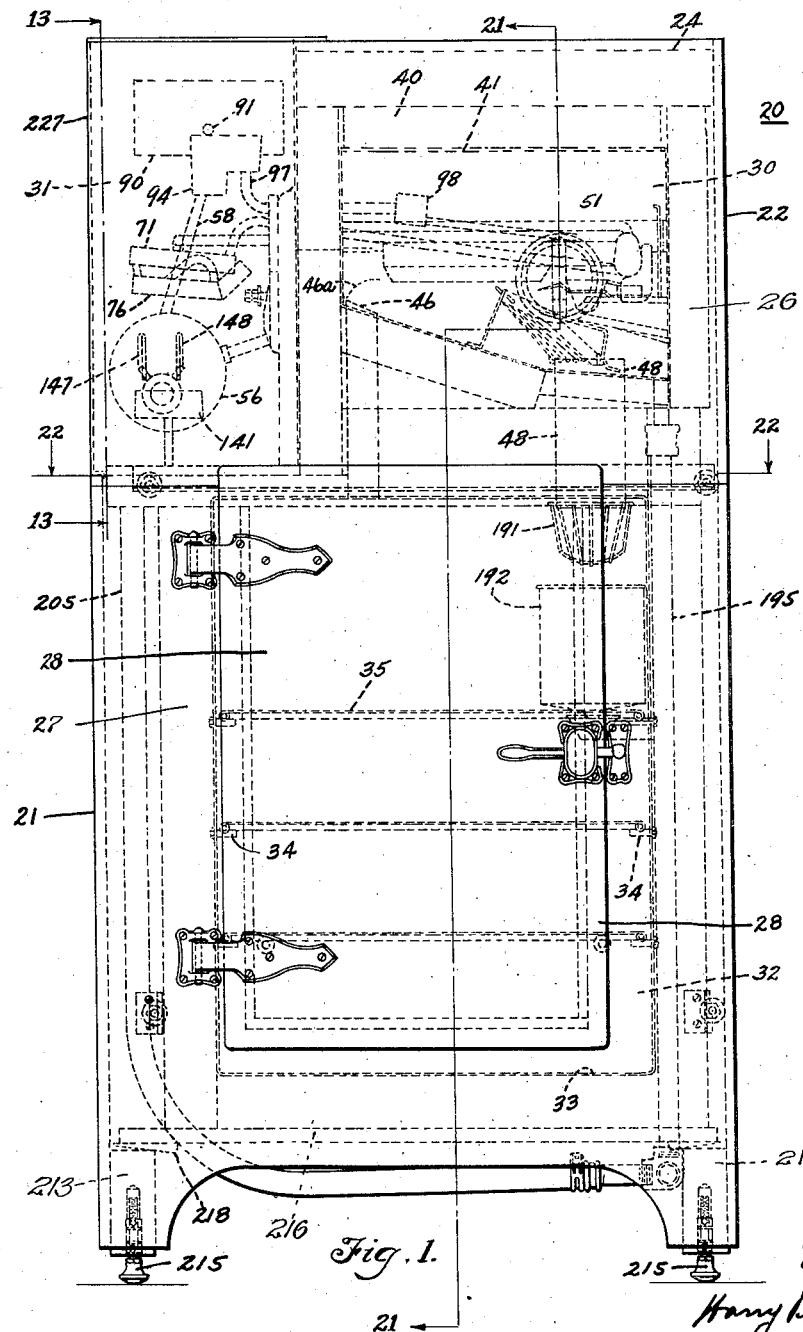
Fig. 1 is a front view in elevation of the improved refrigerator.

Referring to the drawings:

The refrigerator cabinet 20 is provided with side walls 21 and 22, a back wall 23, a top wall 24 and a front wall 26. Front wall 26 includes an opening closed by a door 28 providing access to the interior of the food compartment 32 of the cabinet.

The cabinet is divided into three compartments including a cooling compartment 30, a machine compartment 31 and the food compartment 32, which is located under compartments 30 and 31. The food compartment 32 is provided with a box like lining 33, the sides of which carry studs 34 which support shelves 35. Corkboard insulation is secured to the sides, back and bottom of the lining 33. Cooling compartment 30 is provided with a lining 36 surrounded by non-conducting vertical walls 37, 37a, 38 and 38a which extend above the lining 36. Near the upper edge, the lining 36 carries brackets 39 which support a removable top 40 of insulating material having an inside lining 41. The wall 40 is slightly smaller than the opening provided by the vertical walls 37, 37a, 38 and 38a to provide a space between the said vertical walls whereby an insulating material 42, such as rubber, can be jammed between the edges of the wall 40 and the surrounding vertical walls. After the insulating material 42 has been removed the top 40 can be readily removed to provide access to the interior of compartment 30. A bottom wall 47 of lining 36 slopes downwardly toward one side of the cabinet and provides a gutter 44 as shown in Fig. 6. This bottom wall 47 is separated from the top wall 33a of food compartment lining 32 by walls including corkboard 43 and ground cork 43a.

*Air circulating system*

Lining 33 is provided with an oblong shaped flange 45 which receives a conduit 46 which extends through the walls 43 and 43a and projects slightly above the bottom wall 47 of cooling compartment 30. Conduit 46 provides a passage for air which is conducted from the food compartment 32 to the cooling compartment 30 and is located at one side of cooling compartment 30. The top wall 33a of lining 32 is also provided with a cylindrical upwardly extending flange 49 adapted to receive the conduit 48 which extends through the wall 43 and projects above the bottom lining wall 47 of compartment 30. It will be noted that the conduit 46 enters the chamber 30 at the highest point of the bottom wall 47 and that the conduit 48 is located at the other end of compartment 30 and its cold air entrance is substantially at the lowest portion of said wall. The air which passes from compartment 32 to compartment 30 is cooled in said compartment 30 and passes through the conduit 48 into the compartment 32. A deflector 46a tends to cause the warm air entering the cooling chamber to be maintained in the lowest and hence coolest part of the chamber, as will be described more fully later.

*Refrigerator mechanism*

The refrigerator mechanism includes primarily a generator-absorber 50 and an evaporator-condenser 51. The generator-absorber is located within the machine compartment 31 and the evaporator-condenser is located within the cooling compartment 30. Elements of the evaporator-condenser and of the generator-absorber are connected together and extend through an opening 52 in the wall 37 and lining 36. The entire refrigerating mechanism is carried by a bracket 53a which is pivotally mounted at 53 upon an L-shaped supporting base 54. Base 54 is supported by the compartment 32 and by the wall 37 of compartment 30. Base 54 is secured to these walls by a plastic material, such as hydrolene.

Figure 13:
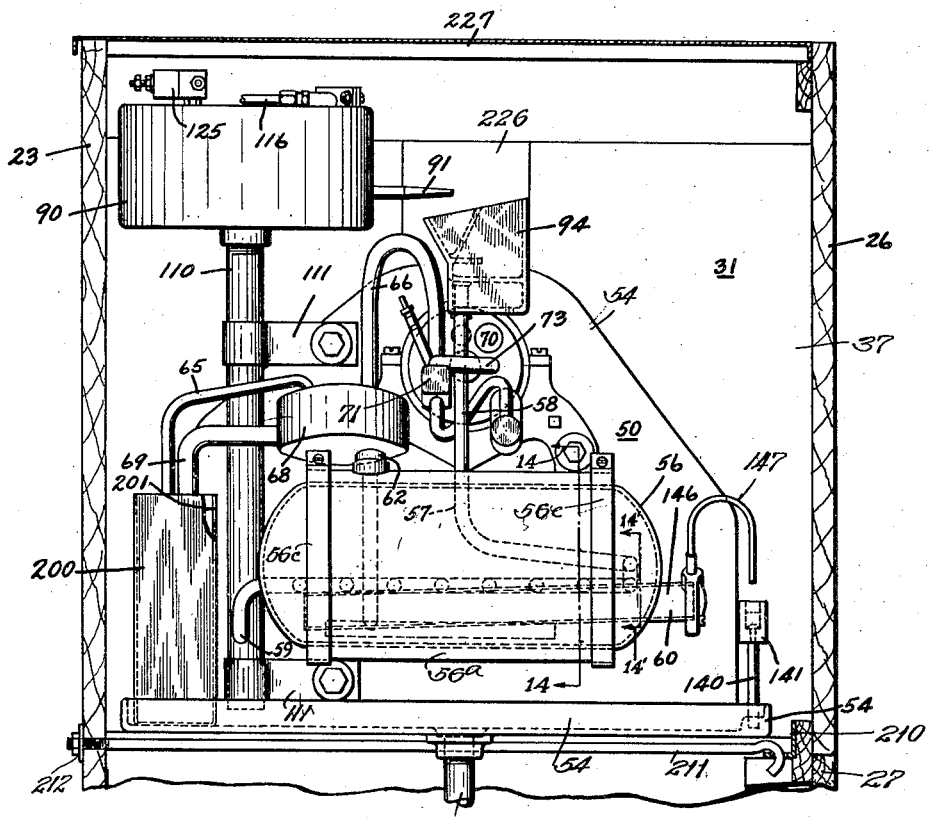
Fig. 13 is a sectional view taken on line 13—13 of Fig. 1.
Figure 14:
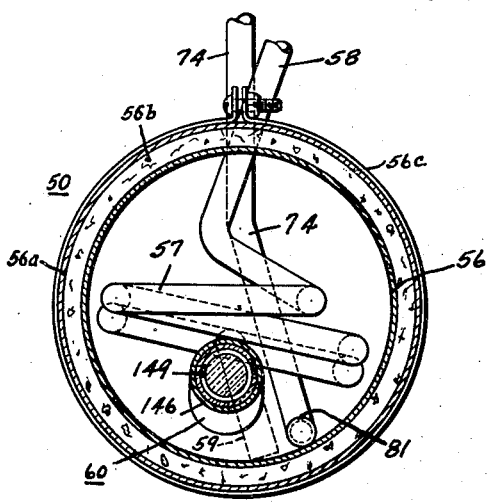
Fig. 14 is a sectional view taken on line 14—14 and 14'—14' of Fig. 13.

The generator absorber 50 comprises a container 56 for a refrigerant absorbent. Referring particularly to Figs. 13 and 14, the generator absorber 50, is provided with an internal cooling coil 57 which is adapted to conduct cooling water therethrough. Pipe 58 extends through the top of container 56 and pipe 59 extends through the end of the container. These pipes respectively conduct water to and from the coil 57. The container 56 is also provided with an internal heating element such as an electrical heating device 60 which is adapted to heat the refrigerant within the container. A circular sheet metal strip 56a surrounds the container 56 but is spaced therefrom by strips of cork 56b placed adjacent the ends of the container 56 thus providing a dormant air chamber surrounding said container which insulates the container. The metal strip 56a and insulating strips 56b are held in place by circular strips 56c. The top of the container 56 is connected by pipe 62 with a chamber 63 (see Figs. 17 and 18). Chamber 63 is provided with a baffle 64 located above the pipe 62 and the chamber is connected with pipes 65 and 66. Chamber 63 is located within a vessel 68 through which water continually flows during one phase of refrigerating cycle and leaves by pipe 69. This mechanism provides a dehydrator for separating and conducting liquid absorbent back into the container 56. Pipe 66 is connected at its other end with a mercury valve 70.

Figure 15:
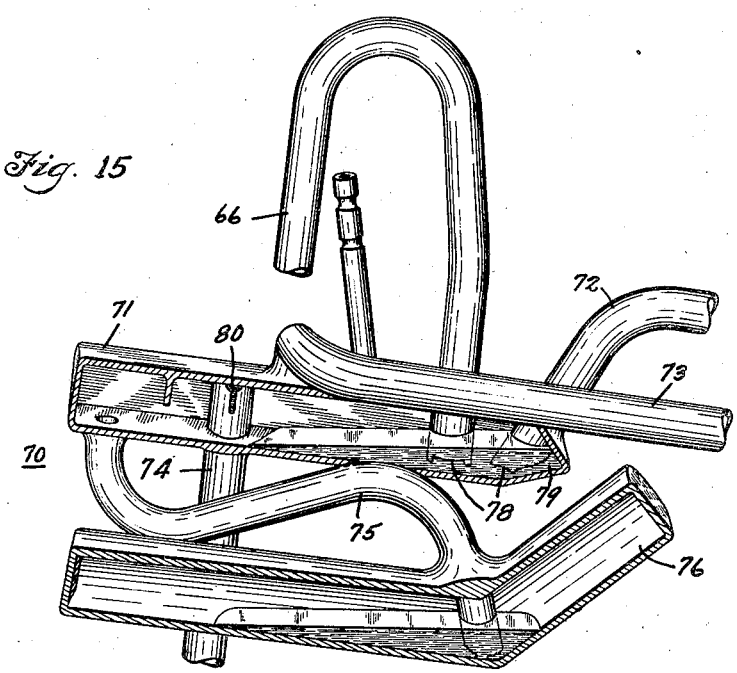
Figs. 15 and 16 are sectional views of one of the controlling valves used in the refrigerating system and showing same in two different poistions.
Figure 16:
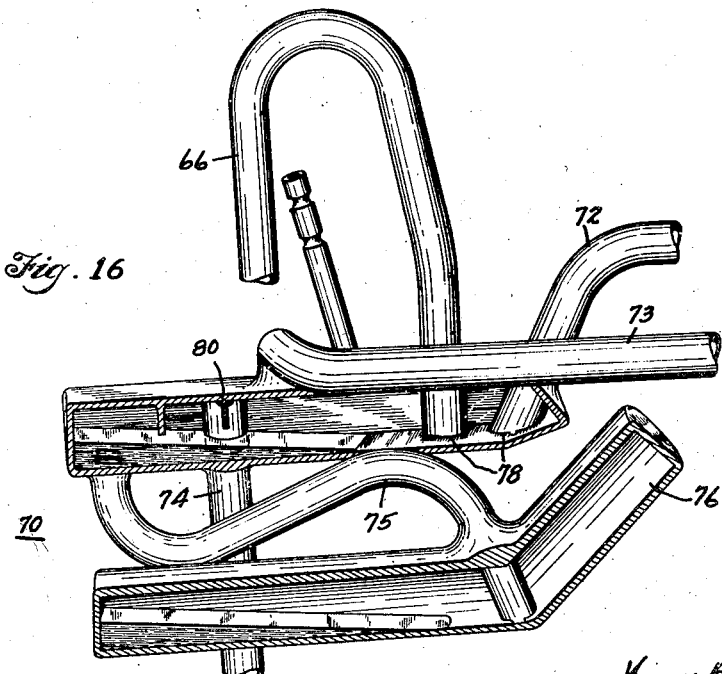
Figure 19:
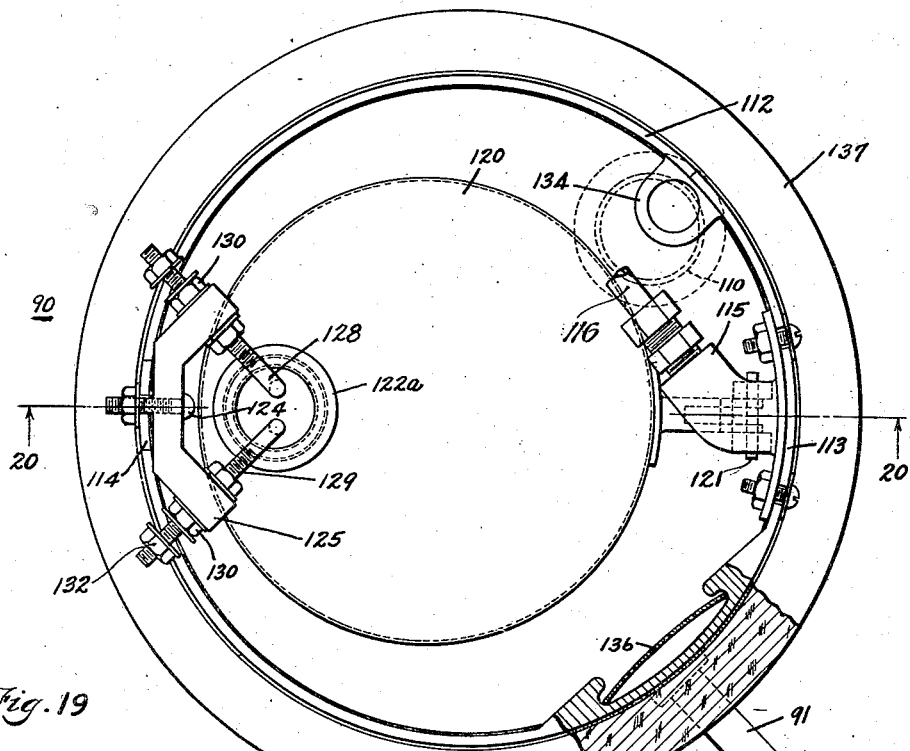
Fig. 19 is a top plan view of a water control box.

Referring to Figs. 15 and 16, the valve 70 includes a mercury chamber 71 which has a flat bottom. Pipes 66 and 72 extend through the top wall of the chamber 71 adjacent one end thereof and engage the bottom wall thereof. Pipe 73 also extends through the top wall of the chamber 71 and terminates adjacent the top thereof. A pipe 74 extends through the bottom wall of the chamber 71 and terminates adjacent the top of said chamber. Another pipe 75 is connected with the bottom wall of the chamber 71 and extends into a mercury storage chamber 76. Pipe 75 is connected to the chamber 71 at the opposite end from that of pipes 66 and 72 and terminates at the bottom of the chamber 76. All of the pipes entering the chambers 71 and 76 are sealed thereto. The lower ends of pipes 66 and 72 which engage the bottom wall of chamber 71 are notched at 78 to provide for the passage of fluid through the same. When the valve is in the position shown in Fig. 15 the mercury 79 seals the bottom of pipes 66 and 72 and prevents the flow of fluid to and from the chamber 71 through the pipes 66 and 72. However, when the valve 70 is in the position shown in Fig. 16, intercommunication is established between pipes 66 and chamber 71 and between chamber 71 and pipe 72, whereby refrigerant may pass from one pipe to the other. The upper end of pipe 74 is notched at 80 and the lower end of this pipe extends into the generator-absorber chamber 56 and terminates adjacent the bottom of said chamber. The lower end of pipe 74 is provided with a series of outlets 81. When the valve 70 is in the position shown in Fig. 15, refrigerant flows through the pipe 73, chamber 71 and pipe 74 and is emitted in the chamber 56 and within the absorbent. The pipe 73 is carried by bracket 53a and extends though the opening 52 in wall 37 and is connected at the end of the evaporator 51 fartherest from the generator.

The evaporator-condenser 51 includes a series of longitudinally disposed tubes 85 which are separately sealed at one end and the other ends extend within a transversely disposed tube 86. Pipe 73 leading from the mercury valve chamber 71 is conunected to the top of tube 86. Pipe 72 which is connected with the mercury chamber 71 is carried by bracket 53a and extends through the opening 52 of the wall 37 and is connected at the lower end of tube 86.

When cooling water is flowing through the coil 57 in the generator-absorber container 56, the absorbent in said container will be cooled causing refrigerant to pass out of the evaporator-condenser 51 by way of the pipe 73. The refrigerant enters the chamber 71 and passes through the notches 80 in the pipe 74, through the pipe 74 to the bottom of container 56 where it bubbles through the absorbent. During this cycle of operation, the valve 70 is in the position shown in Fig. 15 and no refrigerant can pass from the tube 86 through the pipes 72 and 66 into the top of the container 56 because the mercury 79 seals the ends of pipes 72 and 66, therefore all the refrigerant emitted from the tube 86 must pass through the pipes 73 and 74. Consequently all refrigerant passing from the evaporator-condenser 51 will enter the container 56 below the level of the absorbent therein and by bubbling through said absorbent will be readily absorbed thereby.

The absorbent within the container 56 is intermittently cooled by water flowing in the coil 57, and is intermittently heated by the electrical heating device 60 by mechanism to be described later. During the phase of the cycle of operation in which heat is being applied to the absorbent within the container 56, the refrigerating mechanism is in such a position that the valve 70 will be in the position shown in Fig. 16. The heating of the absorbent will cause the refrigerant to be vaporized, and the vaporized refrigerant will pass out of the container 56 through the pipe 62 leading to the dehydrator chamber 63. Cooling water flowing around the chamber 63 will condense all of the absorbent but will not condense the refrigerant. The condensed absorbent will flow from the chamber 63 through the pipe 62 back into the container 56, and the vaporized refrigerant will flow through the pipe 66 into the mercury chamber 71. The passage between the pipe 66 and pipe 72 being no longer sealed by the mercury within the chamber 71, the refrigerant will pass into the chamber 71 thence to pipe 72 from whence it is conducted to the tubes 86 and 85. It will thus be seen that the valve 70 permits the passage of refrigerant from the top of container 56 during the cycle of operation in which heat is being applied within the container 56. From the foregoing it is apparent that the valve 70 must positively prevent the passage of fluid from the pipe 72 and pipe 66 during one cycle of refrigerating operation and during another cycle of operation the passage between said pipes must be unobstructed. Therefore, the applicant has provided a valve which includes a chamber 71 having a flat bottom in order to facilitate the manufacture of uniformly reliable mercury valves. In case the chamber 71 has a cylindrical bottom wall and the pipes 66 and pipes 72 are not assembled uniformly, the amount of mercury necessary to cover the end of the pipes will vary greatly. If there is too much mercury, then the ends of pipes 66 and 72 will not be uncovered when the valve is tilted in one position. With this type of construction a predetermined quantity of mercury will perform the function necessary namely, that of closing the passage between pipes 66 and 72 when the valve is in one position, and when the valve is in the other position, said passage will be unobstructed.

Figure 3:
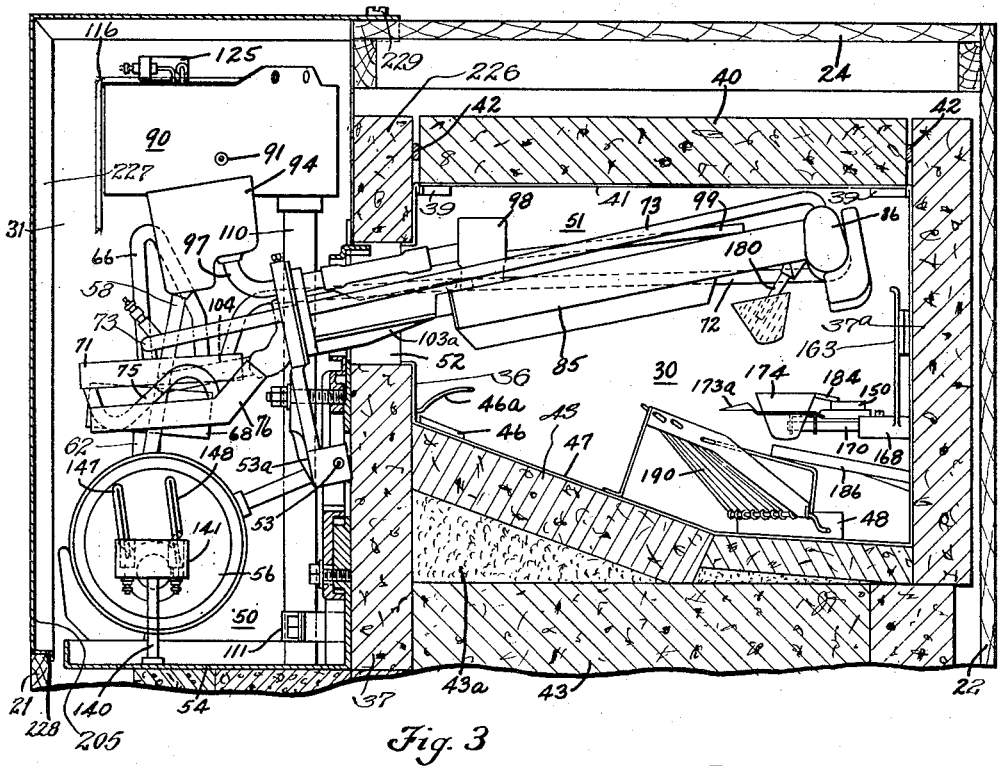
Fig. 3 is a sectional view similar to Fig. 2 showing the refrigerating mechanism in another position.

In preparing the refrigerator for shipment, the refrigerating mechanism is placed in the position shown in Fig. 3. The generator-absorber 50 is heated by device 60 and the pressure created, within the mechanism by such heating, will force the mercury out of chamber 71 and into storage or shipping chamber 76. The mercury will not rise high enough to cover the opening of pipe 75 in chamber 76. When all the mercury is forced into chamber 76, the refrigerating mechanism is clamped in the position shown in Fig. 3. Thus it will be apparent that when all the mercury is trapped within chamber 76, and when the mechanism is clamped in position for shipment, no rise in pressure within the chamber 76 will force mercury into chamber 71, as the mercury is clear of the end of pipe 75 no matter on which side the refrigerator as a whole is moved during shipment. During the cooling phase of the generator-absorber 50, the pressure in the mechanism will fall and the pressure within chamber 76 will force the mercury back into chamber 71 so that it will be available for sealing the ends of pipes 66 and 72, as previously described.

*Cooling of generator-absorber and evaporator-condenser*

Figure 4:
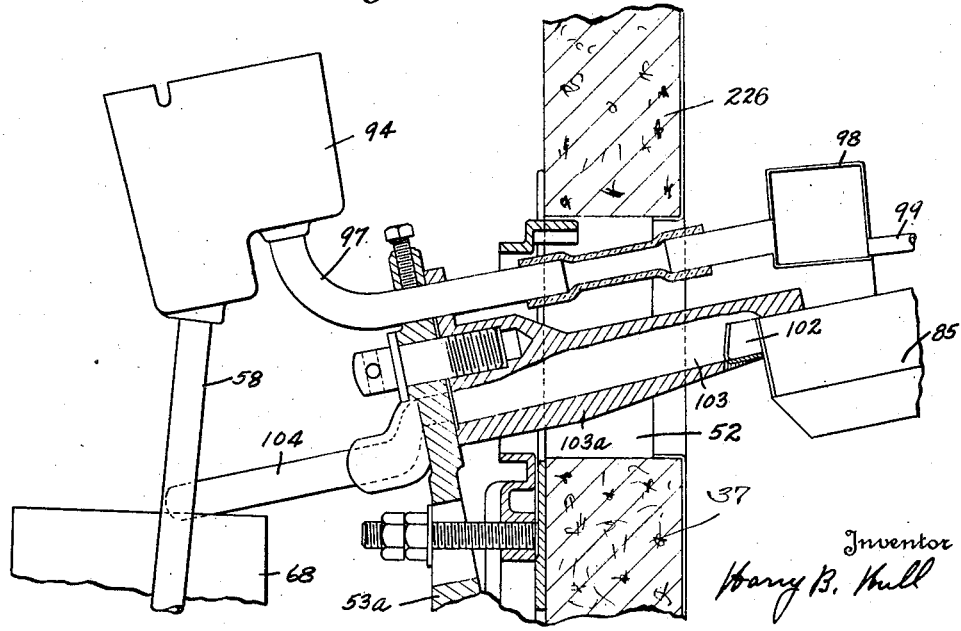
Fig. 4 is a fragmentary sectional view of a portion of the refrigerating mechanism.
Figure 9:
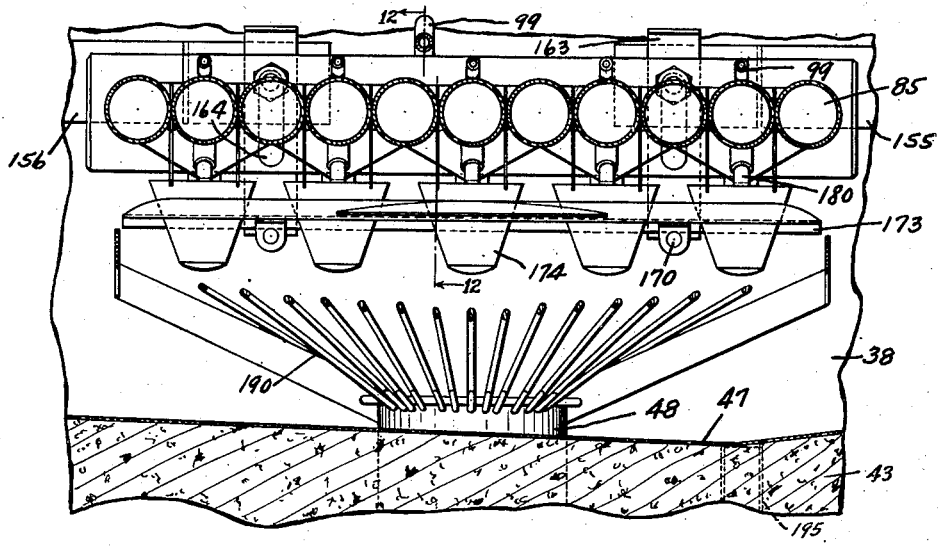
Fig. 9 is a sectional view taken on line 9—9 of Fig. 5.

The cooling water for the evaporator-condenser 51 and the coil 57 is applied intermittently to said elements from a common source of supply. This source of supply includes a water-box 90 having a spout 91 leading therefrom. Water passing from the spout 91 enters either compartment 92 or compartment 93 of a water receiving receptacle 94. These compartments are separated from one another by a wall 95. The water which enters the compartment 92 flows through the pipe 58 which is connected to the bottom thereof and when the refrigerating mechanism is in the position shown in Fig. 2, the water passing from the spout 91 will flow through pipe 58, coil 57 and pass out of the container 56 through the pipe 59, thereby cooling the absorbent within the container 56. The water receptacle 94 is carried by the refrigerating mechanism and is adapted to be rocked when said mechanism rocks about the pivot 53. Therefore, when the mechanism is rocked to the other position shown in Fig. 3, the receptacle 94 will move so that the compartment 93 of the receptacle 94 will be located below the spout 91. Water passing out of the spout 91 will then enter the compartment 93 whence it will be conducted through a pipe 97 carried by the bracket 53a and extending through the opening 52 in wall 37 and will flow into a water-box 98. Water-box 98 is located above evaporator-condenser 51 and is provided with a series of outlets connected by pipes 99 which extend from said box 98 to adjacent the opposite end of the longitudinally disposed evaporator tubes 85. Pipes 99 terminate at the top of the tubes 85 and the water flowing from said pipes will flow over the tubes 85 and in troughs 100 formed and between said tubes. During this cycle of operation the evaporator-condenser will be in such position that the water flowing in the troughs 100, will pass into a catch basin 102, see Fig. 4, formed at the end of tubes 85 adjacent wall 37 where it is connected to channel 103 through the opening 52 in the wall 37, and, channel 103 is formed in a member 103a which carries the evaporator-condenser 51 and is secured to the bracket 53a. Channel 103 forms a conduit connected with a pipe 104 which terminates above the water receptacle 68 of the dehydrator.

The water-box 90 is carried by a pipe 110 which is supported upon the vertical arm of base 54 by straps 111. Water-box 90 includes a water receptacle 112 to which the pipe 110 is threaded. Receptacle 112 is provided with ears 113 and 114 disposed on opposite sides of the container and projecting above the main portion thereof. Ear 113 carries a valve body 115 to which a water inlet pipe 116 having communication with a passage 117 is secured. Valve 119 is pivotally carried by a float 120, said float being pivotally mounted at 121 upon ears 121a which form a portion of the body 115. The float operating through the valve 119 maintains water at a certain level within the receptacle 112.

Float 120 carries an open top chamber 122 adapted to receive a receptacle 122a containing a predetermined quantity of mercury. The receptacle 122a is located adjacent the ear 114 of receptacle 112. Ear 114 is slotted as shown at 123 and receives a screw 124 which supports an insulating block 125. Insulating block 125 carries terminals including contact bars 128 and 129. The bars 128 and 129 extend downwardly into the mercury within the receptacle 122a. Bars 128 and 129 are threaded and adjustably secured to the block 125 in desired relation with respect to the mecury containing vessel 122a by nuts 130. Electrical conductors are secured to the bars 128 and 129 by nuts 132.

Figure 20:
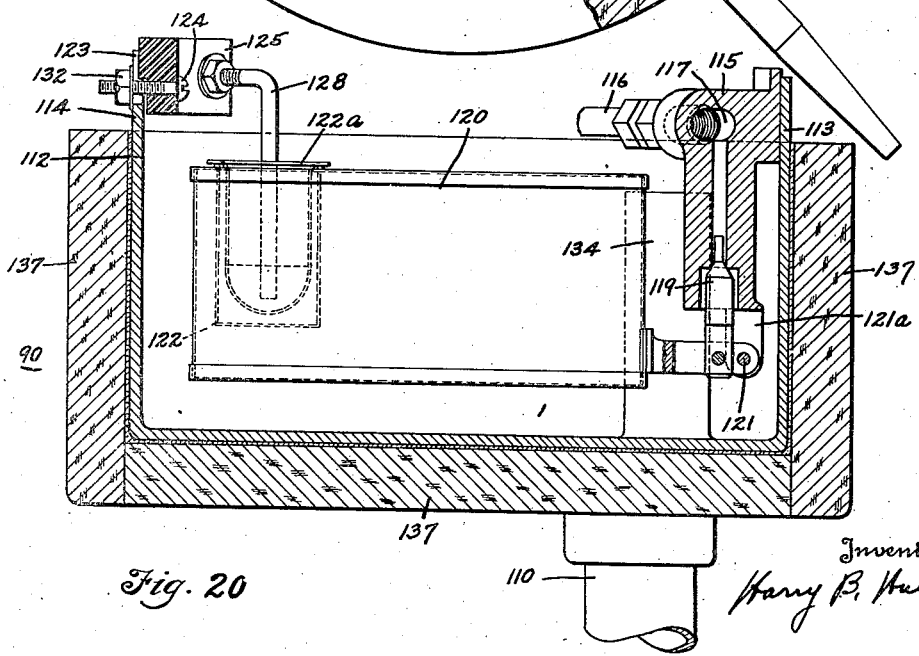
Fig. 20 is a sectional view taken on line 20—20 of Fig. 19.

The electrical circuit for heating device 60 of the generator-absorber 50 includes the bars 128 and 129. Therefore, if the float 120 is in the position shown in Fig. 20, bars 128 and 129 are bridged by the mercury within the container 122 to complete the circuit to the heating device 60 at this point. However, if there is a failure of a sufficient quantity of water for the successful operation of the refrigerating mechanism, that is, if water tends to pass out of the spout 91 faster than it is delivered to the receptacle 112, the float 120 will fall and when this occurs, the mercury receptacle 122a will move away from the bars 128 and 129 thus separating the bars from the mercury within the said receptacle. Thus the current to the heating device 60 will be interrupted when the water delivered to the refrigerating machine is insufficient. A hollow boss 134 provides an overflow for the receptacle 112. The inlet to the boss 134 is located above the normal level of the water within the receptacle 112 and the outlet is in communication with the pipe 110. The boss 134 will conduct the excessive amount of liquid out of the receptacle 112, if for any reason the float for controlling the valve 119 does not function properly. The outlet spout 91 for the receptacle 112 is located adjacent the valve body 115. The inlet to the spout 91 is covered by a screen 136. Since the spout 91 is located adjacent the inlet valve to the water box, water entering into the receptacle will pass substantially directly out of the receptacle, while the main body of water within said receptacle lies substantially dormant, and therefore the temperature of the main body of water within the receptacle will be higher than the temperature of the water passing through said receptacle. The temperature of the water within the receptacle is not materially affected by the water passing through said receptacle, therefore the difference in temperature between the water in the receptacle and the environment temperature is not such as to cause condensation on the exterior of the water-box. To further prevent condensation on the water-box, the receptacle 112 is surrounded by an insulating material 137.

The horizontal arm of the base 54 carries a post 140 which supports terminal block 141 of insulating material such as lava, having two cups, 142 and 143 and terminals 144 and 145 extend respectively through the bottom walls of said cups and are connected in the circuit of a heating coil 149. Cups 142 and 143 each contain a quantity of mercury.

The heating device 60 includes the heating coil 149 which is located within a tube 146. The heating coil 149, bars 147 and 148 and the bars 128 and 129 at the water box 90 are arranged in series relation, and when sufficient quantity of water is being delivered to the box 90, and when the refrigerating machine is in the position shown in Fig. 3, current will be supplied to the heating coil 149.

Figure 10:
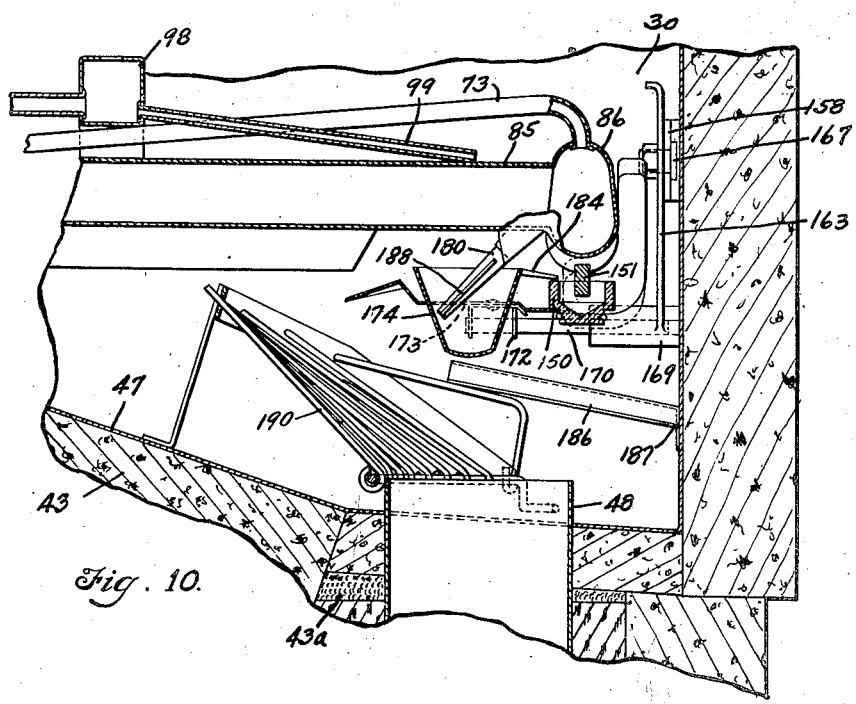
Fig. 10 is a sectional view taken on line 10—10 of Fig. 5.

Directly below the transversely disposed tube 86 of the evaporator-condenser 51, there is provided a cup 150 (Fig. 10) adapted to contain water. A peg 151 is carried by the tube 86 and is adapted to extend within the cup 150. At certain times, to be explained, the water within the cup 150 will freeze and hold the peg 151 in position as shown in Fig. 2.

Operation

Assuming that the refrigerating mechanism is in the position as shown in Fig. 3, the conductor bars 147 and 148 of the heating device 60 are emerged in the mercury in cups 142 and 143 causing the heating coil 149 to heat the absorbent and refrigerant within the receptacle 56. The vaporized refrigerant will be driven to the top of the receptacle 56 and pass through the pipe 66 and valve chamber 71 and pipe 72 and into the tube 86 of the evaporator-condenser 51, the valve 70 being in the position shown in Fig. 16. At this time the water receptacle 94 is in the position whereby water issuing from the spout 91 will enter the compartment 93 of said receptacle, and be conducted by pipe 97 to box 98 whence it is distributed by pipes 99 over the tubes 85. The refrigerant passing into the tube 86 and likewise tubes 85 will be under relatively high pressure and when the water from the pipes 99 passes over the tubes 85, the water will cool the refrigerant in said tubes causing the refrigerant to condense therein. After a substantial quantity of refrigerant has been driven out of the generator-absorber 50 into the evaporator-condenser 51, the evaporator-condenser will overbalance the generator-absorber and the machine will rock about its pivot 53 into the position shown in Fig. 2. When this occurs, the conductor bars 147 and 148 will be withdrawn from the mercury in the cups 142 and 143 thereby breaking the circuit to the heating coil 149. Likewise, the water receptacle 94 will move to the position whereby the water from the spout 91 will no longer enter the compartment 93 but will enter the compartment 92. The water entering the compartment 92 will pass by way of pipe 58 through the cooling coil 57 of the generator evaporator and thereby cool the absorbent within the container 56. The cooling of the absorbent will cause a reduction of pressure in the system and thereby cause the refrigerant within the evaporator-condenser 51 to evaporate causing refrigeration within the compartment 30. When the refrigerating mechanism is in this position the valve 70 will be in a position shown in Fig. 15, in which position intercommunication is cut off between the pipes 66 and 72 whereby the refrigerant from the evaporator-condenser will pass by way of pipes 73 and 74 to the bottom of the receptacle 56. The refrigerant bubbling through the absorbent will be absorbed. Since the mercury within the valve 70 prevents the flow of refrigerant through pipes 72 and 76, the refrigerant passing in the receptacle 56 must pass through the absorbent and no refrigerant will enter by way of pipe 66 into the receptacle 56. This prevents the syphoning of refrigerant from the evaporator-condenser to the generator-absorber.

Figure 2:
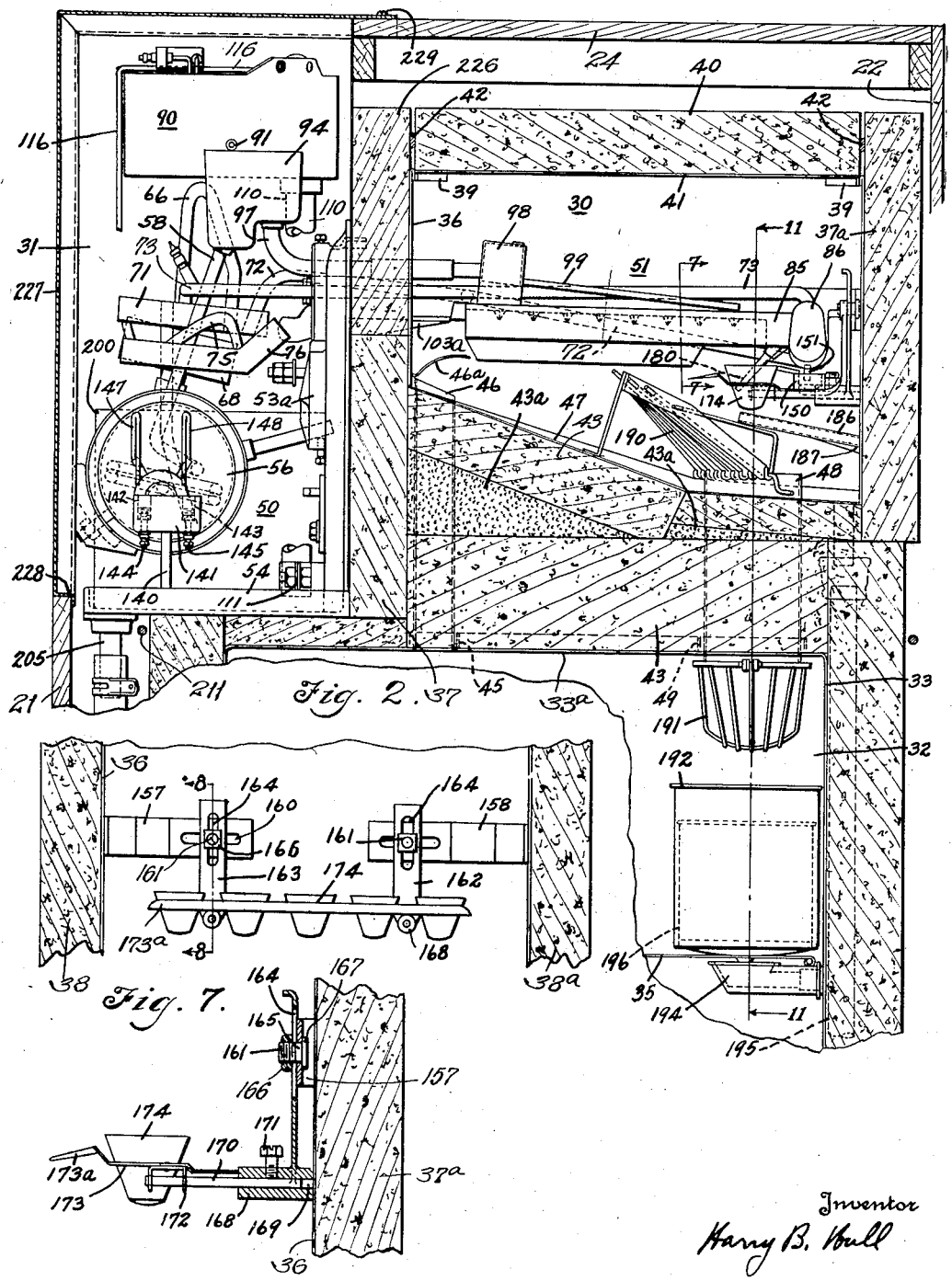
Fig. 2 is a sectional view of the cabinet showing the front of the refrigerating mechanism in elevation, the section being taken on substantially line 2—2 of Fig. 5.

Continuous vaporization of the refrigerant within the tubes 85 and 86 will cause continuous reduction in temperature within the compartment 30 and the water within the cup 150 will freeze and hold peg 151, and thereby hold the entire machine in the position shown in Fig. 2, although such absorption may have taken place, within the generator absorber, which is sufficient to cause the generator-absorber 50 to overbalance the evaporator-condenser 51. In this manner the rocking of the refrigerating machine is delayed. As long as the temperature within the compartment 30 is substantially at water freezing temperature, the refrigerating machine will remain in the position shown in Fig. 2. After the temperature of the compartment 30 rises above the freezing temperature, the ice within the cup 150 will melt releasing the peg 151, and, due to the fact that the generator-absorber is now heavier than the evaporator-condenser, the refrigerating machine will rock to the position shown in Fig. 3. Then the cycle of operation will be repeated as previously described.

Ice harvesting device

As viewed in Fig. 5, the right hand side of compartment 30 carries brackets 155 and 156. These brackets are carried by a front and back corner of the lining 36 for a purpose to be explained below. Inwardly extending portions 157 and 158 of said brackets are spaced from the lining 36 and are each slotted at 160 to receive a flat shank 165 of a screw 161, said shank 165 being slidable within the slot 160. Vertically disposed brackets 162 and 163 are provided with slots 164 each to receive the screw 161. The brackets 162 and 163 are secured to the brackets 158 and 159 by screws 161 and nuts 166. Heads 167 are provided on the screws 161 and are disposed between the bracket portions 158 and 159 and the lining 36 to limit displacement of the screws 161. The screws are prevented from turning by the shank portion 165. Brackets 162 and 163 each include a lug 168 provided with a hole 169 extending therethrough and adapted to receive a rod 170. Rod 170 is adjustably secured in position by a set screw 171. The inwardly extending ends of rod 170 are secured to brackets 172 which are in turn secured to a platform 173, which carries water receiving cups 174.

The under side of every other tube 85 carries an ice peg 180 which is oblique to the ice cups 174. The cups 174 are spaced apart so that the pegs 180 extend within the cups 174 and the entire supporting platform 173 for the cups 174 is adjustable with respect to the pegs 180 by means of the adjustable supporting brackets 157 and 158, which permit a horizontal movement of the platform while the slots 164 in the brackets 162 and 163 permit a vertical movement of said platform, and the supporting rods 170 being slidable within the holes 169, permit a horizontal movement of the platform 173 which is transverse to the other horizontal movements.

During the generator-absorber heating cycle, at which time water is flowing into the water-box 98, there is a quantity of water within the compartment 93 of receptacle 94 and in the pipe 97, box 98 and pipes 99. When the refrigerating mechanism is tilted to the position shown in Fig. 2, water will no longer flow from the spout 91 into the compartment 93, however, the water in the parts 93, 97, 98 and 99 will flow from the pipe 99 over the tubes 85. Openings 182 are formed adjacent the outer ends of tubes 85. These openings are formed by omitting the weld between the ends of the tubes 85. (See Fig. 12). The water flowing upon tubes 85 when in the position shown in Fig. 2, will pass through these openings 182 and enter troughs 183 which are adapted to direct the water into the cups 174. A trough 184 connects one of the cups 174 with the cup 150 in order to supply water to the latter.

The purpose of securing brackets 155 and 156 to the corners of the lining 36 is to prevent any buckling of the sides of the lining 36 from affecting the position or adjustment of the cups 174 with respect to the pegs 180, or the cup 150 with respect to the peg 151. In the mass production of large linings of this character having flat sides it is extremely difficult and expensive to insure that the sides of a lining will be perfectly flat or will remain perfectly flat after manufacture. The linings buckle or warp during handling or changes of temperature and it has been found that during such buckling or warping the corners of the linings suffer the least change of position. Consequently by supporting the brackets solely on the corners and away from the center of the sides of the lining any movement of the ice cups due to warping of the lining is reduced to a minimum. A water shed 173a is carried by the platform 173 and a drip pan 186 is located below the cups 174 and cup 150 and inclined downwardly toward the side wall of the compartment 30 and is provided at the lower end within the opening 187. Drip pan 186 and water shed 173a are located above conduit 48 and are adapted to direct excessive water, flowing from cups 174 and 150 and such water which drips off of the elements within compartment 30, so as to prevent water passing from the cooling compartment into the food compartment through the conduit 48.

During the refrigerating cycle, the evaporation within the tubes 85 and 86 will cause heat to be conducted from the water within the cups 174 through the pegs 180 and cause the freezing of the water within said cups. After the evaporator-condenser 51 becomes heated to a certain degree, the exterior of the ice blocks within the cups will melt and the blocks will be released from the cups. This releasing will occur before the stud 151 is released from the ice within the cup 150 because the cup 150 is constructed of material of poor heat conductivity and is not the direct path of circulating air. When the stud 151 is released as previously explained, the evaporator-condenser 51 will move upwardly and the pegs 180 will withdraw the ice blocks from the cups 174 as shown in Fig. 3. The temperature of the pegs 180 then increase to release the blocks therefrom and these pegs are tapered inwardly and downwardly so that after the block starts to slide upon a peg the block will continue to move. The pegs are also provided with fins 188 which prevent turning of the ice blocks upon the said pegs. Such turning might prevent the dropping of an ice block from a peg in case the blocks were permitted to turn as they started to slide from the peg.

Conduit 48 carries a conveyer 190 for conducting the blocks of ice which fall from the pegs into the conduit 48. The lower end of the conduit 48 carries a conveyer 191 which conducts the ice blocks into a receptacle 192. The receptacle 192 is not located directly under the conduit 48 and therefore, does not obstruct the currents of air passing from the cooling compartment 30 into the food compartment 32. The receptacle 192 is carried by one of the food shelves 35. The lower end of the receptacle 192 is provided with an opening 193 which conducts the drainage from said receptacle to a vessel 194 which is connected with a drain pipe 195. A screen 196 is carried within ice receptacle 192 and terminates a substantial distance below the top of said container. The ice conducted into said container will rest within the screen 196. This screen separates the ice from the relatively warm walls of the receptacle 192 thereby preventing the quick melting of said ice blocks. If the ice blocks build up within receptacle 192 above the level of the screen 196, the blocks will directly engage the walls of the receptacle 192, and, since these walls are relatively warm, the ice blocks will melt readily. Therefore, it will be apparent that the receptacle will not overflow with ice blocks because the blocks will melt when they engage the walls of said receptacle 192.

The entire bottom wall 47 of the cooling compartment 30 slopes towards the drain 195. Drain 195 extends along the side of the lining 33 and also provides a drain for the receptacle 194. The conduits 46 and 48 leading respectively from and to the food compartment 32 extend a substantial distance above the bottom wall 47 to prevent the water from passing through said conduits into the food compartment 32. It will be apparent that a relatively simple drain device has been provided for the cooling compartment 32 and the vessel 194.

Since lower portion of cooling compartment is the coldest part of said compartment, the deflector 46a is used for directing the air, passing out of conduit 46, through said coldest portion and against the lower part of evaporator-condenser 51. The conveyers 190 and 191 are constructed of wire and the ice receiving receptacle is located at one side of the conduit 48, therefore the flow of air through the cooling compartment 30 and into the food compartment 32 is not materially obstructed.

The machine supporting base 54, carries an overflow water-box 200, the top of which is notched at 201 to provide an overflow. All of the water which flows from the evaporator-condenser through the dehydrator chamber 68 is conducted by pipe 69 into the water-box 200. Pipe 65 which is connected at one end with the dehydrator chamber 63, is provided at its other end with a safety valve 203 which is immersed in the water within the water-box 200. If for any reason there is an excessive pressure within the refrigerating system the safety valve will open to release the refrigerant into the water within the box 200. The base 54 forms a basin and conducts the water from the box 200 and the water from the pipe 59, leading from the coil 57 in the generator-absorber 50, to a drain pipe 205. Drain pipe 205 is located between the wall 21 and the cork insulation for the compartment 32 and extends underneath the cabinet where it connects with drain pipe 195.

*Cabinet construction*

The front of the cabinet comprises two main portions 26 and 27. Portion 27 carries two horizontally disposed angle irons 210 adjacent the top and bottom thereof. The angle irons are secured adjacent the center thereof to the front 27 by screw 210a. (See Fig. 22.) When assembling the cabinet the portion 27 is placed face down and the lining 33 of food compartment 32 is secured thereto. After the cork insulation is placed upon the lining 33, the back 23 is then laid upon the insulation. Tie-rods 211 are connected to the ends of the angle irons and extend throughout the width of the cabinet and through the back 23. The ends of the tie-rod are screw threaded to receive nuts 212 by which the back 23 is drawn toward the front. When the nuts are tightened the food compartment 32 and insulation therefor are clamped between the front 27 and back 23.

The lower corners of both the front 27 and back 23 carry posts 213 and 214 to which gliders 215 are secured. The upper ends of posts 213 and 214 terminate below the bottom insulation for cabinet 32. A board 216 extends throughout the width of the insulation and above post 213 in the front of the cabinet, and board 217 is similarly located above the post 214 in the back of the cabinet. Wedges 218 are driven between the posts 213 and 214 and boards 216 and 217 to support the cork insulation and lining 33. In this manner slight variations in the dimensions of the cork lining and posts are readily taken care of.

The insulation on the back of the lining 32 is cut away and carries wood inserts 220 and the back 23 is secured to these inserts by screws 221. The inserts are secured to the cork by a plastic material such as hydrolene and since the back 23 is secured thereto, the back of the lining 33 and insulation therefor cannot shift sidewise.

The cooling compartment 30, the lining 36 and the insulation therefor are built upon the insulation of top wall 33a of the lining 33. The sides 21 and 22 are then secured to the front and back of the cabinets. Then the top 24 is secured to sides 21 and 22. It will be noted that the back edge of the sides 21 and 22 do not engage the back wall 23 but can extend any distance beyond the back 23. Therefore, it is not necessary to provide sides of an accurate depth since said sides do not necessarily fit flush with the back 23. The top 24 and the sides 21 and 22 are made the same depth, therefore, the corners thereof meet in the back of the cabinet, and when the cabinet is placed against the wall, rear wall 23 cannot be seen and, therefore, it is immaterial if said rear wall 23 does not fit flush with the back edges of sides 21 and 22 and top 24.

The side wall 21 extends only along the side of food compartment 32 and ends adjacent the bottom of the machine supporting base 54 and the top 24 extends only over the cooling compartment 30. An L-shaped cover 227 encloses the side and top of machine compartment 31. Cover 227 is carried by side wall 21 and is provided at its lower end with a flange 228 which hooks over the top of side 21. The top of cover 227 extends over top wall 24 and is secured thereto by screws 229.

The front section 26 is removably secured to side wall 22 and front section 27 and can be removed without removing the portion 27 whereby access may be had to the front of the refrigerating mechanism within machine compartment 31. The front insulating wall of compartment 30 is provided with an opening 223 which is closed by a plug 224 having a handle 225. When the front section 26 is removed, the plug 224 can be removed whereby the attendant may view the interior of compartment 30.

Wall 37 between compartments 30 and 31 includes a removable portion 226 which when removed lays bare that part of the mechanism which extends through said wall. Therefore, when the top 24, L-shaped cover 227, and the top 40 of the compartment 30 are removed, the entire refrigerating mechanism can be removed upwardly. Sufficient clearance is provided between the walls of compartments 31 and 32 whereby the mechanism can be tilted and moved so that said mechanism will clear the water-box 90 and therefore can be removed through the top without removing said water-box. It is apparent that substantially any part of the refrigerating mechanism can be removed independently of other parts thereof.

While the form of embodiment of the present invention as herein disclosed, constitutes a preferred form, it is to be understood that other forms might be adapted, all coming within the scope of the claims which follow.

What is claimed is as follows:

1. A refrigerator, comprising a food compartment, a cooling compartment located above the food compartment, a wall separating said compartments, said wall having a plurality of passages interconnecting said compartments, one of said passages terminating at a higher point in the cooling compartment than the other, a substantially horizontally disposed evaporator within the cooling compartment and located entirely above the level of both passage openings, and means for directing air as it flows from the higher extending passage below the evaporator and toward said other passage.

2. A refrigerator, comprising a food compartment, a cooling compartment located above the food compartment, a wall separating said compartments, said wall having a plurality of passages interconnecting said compartments and located adjacent opposite sides of the cooling compartment, one of said passages terminating at a higher point in the cooling compartment than the other, a substantially horizontally disposed evaporator within the cooling compartment entirely above the level of both passage openings, said evaporator forming a wall for providing upper and lower portions of the compartment, and means cooperating with the evaporator for directing air as it flows from the higher extending passage through said lower portion and toward said other passage.

3. A refrigerator, comprising a food compartment and a cooling compartment, a wall between said compartments, said wall having passages, one of said passages conducting all of the air passing from the cooling compartment to the food compartment, the second passage conducting the air from the food compartment to the cooling compartment, an evaporator within the cooling compartment, and a receptacle for receiving water to be frozen, one of said passages being unobstructed to the passage of solid bodies and arranged to conduct ice from the cooling compartment to the food compartment.

4. A refrigerator, comprising a food compartment and a cooling compartment, a wall between said compartments, said wall having passages, one of said passages conducting all of the air passing from the cooling compartment to the food compartment, the second passage conducting air from the food compartment to the cooling compartment, an evaporator within the cooling compartment, a receptacle for receiving water to be frozen to an ice block, means for conducting the ice block into one of said passages, said means having an opening for the passage of air therethrough.

5. A refrigerator, comprising a food compartment and a cooling compartment, a wall between said compartments, said wall having passages, one of said passages conducting all of the air passing from the cooling compartment to the food compartment, the other passage conducting air from the food compartment to the cooling compartment, an evaporator within the cooling compartment, a receptacle for receiving water to be frozen, means for delivering ice to one of said passages, said last mentioned passage being adapted to conduct ice from the cooling compartment to the food compartment, a receptacle within the food compartment for receiving said ice, said receptacle being located remote from the second passage, and means for conducting the ice from the second passage to said receptacle, said means having an opening for the passage of air therethrough.

6. A refrigerator, comprising a food compartment and a cooling compartment, a wall between said compartments, said wall having passages, one of said passages conducting all of the air passing from the cooling compartment to the food compartment, the second passage conducting air from the food compartment to the cooling compartment, an evaporator within the cooling compartment, a receptacle for receiving water to be frozen to an ice block, means for conducting the ice block into one of said passages, said means having an opening for the passage of air therethrough, a receptacle within the food compartment for receiving said ice, said receptacle being located remote from the second passage, and means for conducting the ice from the second passage to said receptacle, said means having an opening for the passage of air therethrough.

7. A refrigerator, comprising a food compartment, a cooling compartment, a wall between said compartments, a substantially horizontally disposed evaporator located within the cooling compartment, a receptacle adapted to receive water to be frozen, said wall having a passage interconnecting the compartments for conducting relatively warm air from the food to the cooling compartment, means for directing the air below the evaporator, said wall having a second passage interconnecting the compartments for conducting relatively cold air and ice formed in said receptacle from the cooling to the food compartment, and means located below the evaporator for conducting the ice to said second passage, said means having an opening for the passage of air therethrough.

8. A refrigerator, comprising a food compartment, a cooling compartment, a wall between said compartments, a substantially horizontally disposed evaporator located within the cooling compartment, a receptacle adapted to receive water to be frozen, said wall having a passage interconnecting the compartments for conducting relatively warm air from the food to the cooling compartments, means for directing the air below the evaporator, said wall having a second passage interconnecting the compartments for conducting relatively cold air and ice formed in said receptacle from the cooling to the food compartment, means located below the evaporator for conducting the ice to said second passage, said means having an opening for the passage of air therethrough, a receptacle within the food compartment located remote from said second passage, and means for conducting ice from the second passage to the receptacle, said means having an opening for the passage of air therethrough.

9. A refrigerator, comprising a compartment to be cooled, an evaporator within said compartment, a receptacle within the compartment and adapted to receive a quantity of water to be frozen, said evaporator having means extending within the receptacle for conducting heat from said receptacle, and means carried by a corner of the walls of the compartment for supporting said receptacle with respect to the first means.

10. A refrigerator, comprising a compartment to be cooled, a movable evaporator within the compartment, a receptacle adapted to contain a quantity of water to be frozen, said evaporator having a peg extending within the receptacle for conducting heat from the receptacle when the evaporator is in one position and for withdrawing the ice, formed in said receptacle, from said receptacle when the evaporator moves to another position, said peg having means for preventing rotation of the ice about the peg.

11. A refrigerator, comprising two rocking refrigerant chambers, a conduit connecting said chambers, said conduit including a pipe connected with one of said chambers, and a second pipe connected with the other chamber, and a chamber connecting said pipes and arranged to rock with said refrigerant chambers, and having a flat-sided portion, one of said pipes terminating in said portion, and a liquid in said portion adapted to seal and unseal the mouth of the pipe therein in accordance with the position of the containers.

12. A refrigerator, comprising two rocking refrigerant chambers, a conduit connecting said chambers, said conduit including a pipe connected with one of said chambers, and a second pipe connected with the other chamber, and a chamber connecting said pipes and arranged to rock with said chambers, and having a flat wall, one of said pipes terminating at said wall within the chamber and being notched for permitting the flow of fluid therethrough and a liquid in said portion adapted to seal and unseal the mouth of the pipe therein in accordance with the position of the containers.

13. In refrigerating apparatus means for storing a predetermined quantity of ice blocks and for limiting the quantity stored, including a receptacle, a second receptacle within the first receptacle terminating below its top, the second receptacle being spaced from the first receptacle to provide an air space between the receptacles and being close enough to the first receptacle to permit ice blocks placed within the second receptacle and projecting above its top to come in contact with the first receptacle.

14. In refrigerating apparatus means for storing a predetermined quantity of blocks of ice and for limiting the quantity stored including an outer receptacle adapted to be exposed to currents of relatively warm air, a receptacle within and spaced from the outer receptacle to provide a dead air space between the receptacles, said inner receptacle terminating below the top of the outer and being sufficiently close to the outer to permit ice blocks projecting above the top of the inner receptacle to contact with the outer receptacle, and a drain for each receptacle.

15. In refrigerating apparatus means for storing a predetermined quantity of blocks of ice and for limiting the quantity stored including an outer imperforate receptacle adapted to be exposed to currents of relatively warm air, a perforated receptacle within and spaced from the outer receptacle to provide a dead air space between the receptacles, the perforated receptacle terminating below the top of the imperforate receptacle and being sufficiently close to the imperforate receptacle and being sufficiently close to the imperforate receptacle to permit ice blocks projecting above the top of the perforated receptacle to contact with the imperforate receptacle, and a drain for the imperforate receptacle.

In testimony whereof I hereto affix my signature.

HARRY B. HULL.